A. SEMMENDINGER.
Camera.
No. 29,523. Patented Aug. 7, 1860.
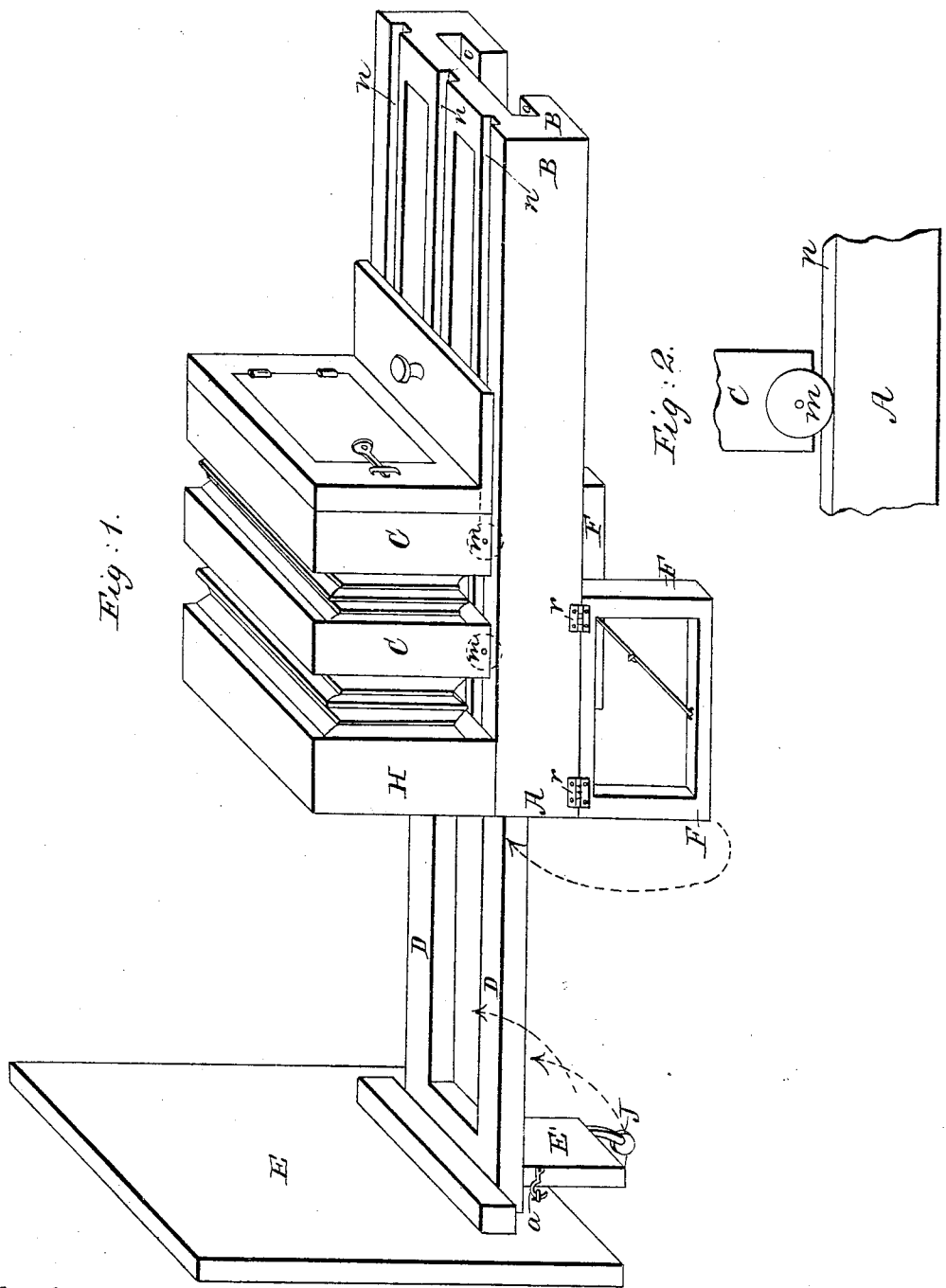

UNITED STATES PATENT OFFICE.

AUGUST SEMMENDINGER, OF NEW YORK, N. Y.

PHOTOGRAPHIC CAMERA.

Specification of Letters Patent No. 29,523, dated August 7, 1860.

*To all whom it may concern:*

Be it known that I, AUGUST SEMMENDINGER, of the city of New York, State of New York, have invented a certain Improvement in Photographic Cameras; and I do hereby declare the following to be a full, clear, and exact description of the same, reference being had to the annexed drawing, making part of this specification, in which—

Figure 1, is a perspective view of my improved camera; Fig. 2, a vertical longitudinal section of a wheel and groove of the same.

The same letters of reference indicate the same parts in these figures.

My improvement consists in moving the extensional part of the camera on wheels, in attaching to the camera a movable frame on which the board containing the original may be attached, and in providing the movable and the fixed frames with stands hinged thereon; all these improvements being introduced for the purpose of facilitating the copying of large pictures by photographing.

To enable others skilled in the art to make and use my invention I will proceed to describe its construction and operation.

In the annexed drawing A B represents the principal frame on which the extensional parts C, C of the camera and the movable frame D, D, are moving.

E represents the board intended to contain the original picture or engraving to be copied, which is attached to the foot E′ of the movable frame by hooks and eyes *a*.

F F represent the stands or bases of the principal frame, the height of which corresponds with the height of the foot E′.

The part H of the camera is immovably fixed to the frame A but the parts C, C, of the camera which serve for lengthening or shortening the same run on wheels $m$, $m$ which move in the longitudinal grooves $n$, $n$, $n$, which are sunk into the top of the principal frame A, B. In like manner the extension frame D D rolls on wheels (not shown in the drawing) in the lower slides $o$, $o$ of the fixed frame A, B. The foot E′ slides on a wheel J for the purpose of facilitating the sliding of the extension frame.

The drawing of Fig. 1, represents the camera ready for the copying of pictures spread on the board E. When the operation of copying is finished the board E may be detached from the extension frame D, the foot E′ may be turned into the said frame as indicated by the arrows and the whole may be shoved into the fixed frame A, B. The stands F, F hinged by hinges $r$ $r$ may be turned upward, and thus the camera when not in use will not occupy more space than the usual camera.

I employ this construction for large photographic cameras, in which an easier working is secured than in those hitherto used. It is also useful in saving time in making the focus of the picture to be copied correspond with the focus of the box, as the center of the board E may be marked, so as to correspond with the center line of the camera box.

What I claim as new and desire to secure by Letters Patent is:

1. The wheels $m$, $m$, in combination with the extensional parts C, C of the camera for the purpose of sliding the same in the grooves $n$ $n$ substantially as described.

2. Attaching the sliding frame D D and the board E to the camera substantially in the manner described.

3. The foot E′ and the stand F F hinged to their respective frames in the manner and for the purpose substantially as described.

AUG. SEMMENDINGER.

Witnesses:
 CHS. WEHLE,
 JUL. WEHLE.